UNITED STATES PATENT OFFICE.

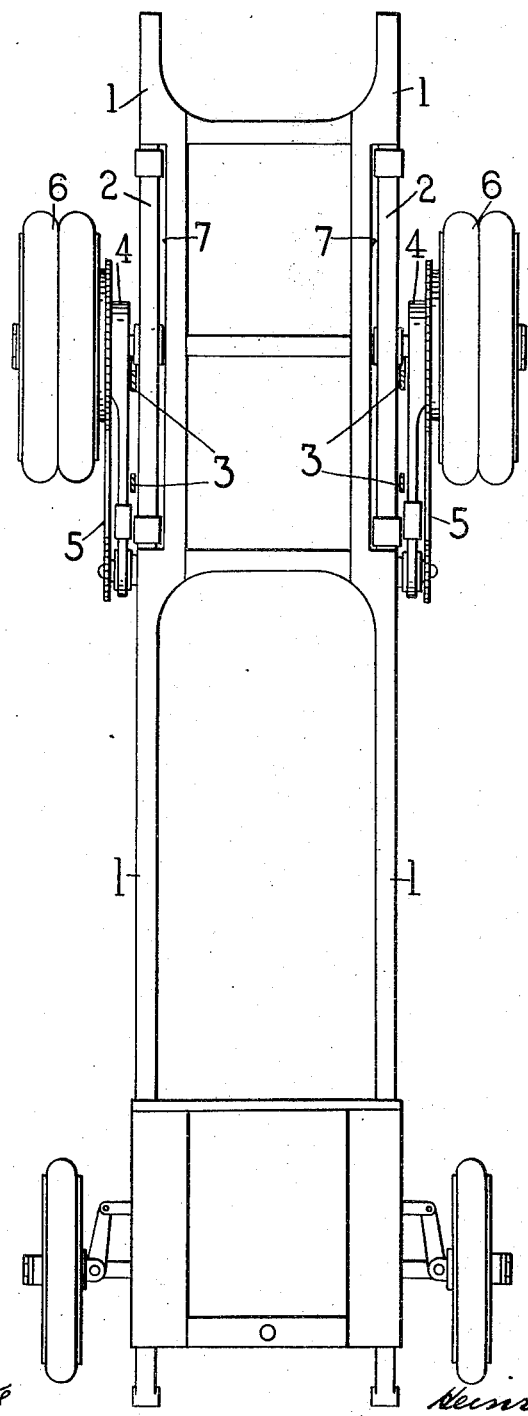

HEINRICH MAYER, OF ARBON, SWITZERLAND, ASSIGNOR TO THE FIRM OF ADOLPH SAURER, OF ARBON, SWITZERLAND.

MOTOR-CAR FRAME.

1,016,282. Specification of Letters Patent. Patented Feb. 6, 1912.

Application filed June 9, 1910. Serial No. 566,018.

*To all whom it may concern:*

Be it known that I, HEINRICH MAYER, a resident of the Confederation of Switzerland, residing at Arbon, in Switzerland, have invented a new and useful Motor-Car Frame, of which the following is a specification.

My invention relates to an improvement in frames for motor-cars, whereby not only the "gage" of the vehicle, that is the distance of the wheels in the cross direction, is reduced, but also all torsion of the longitudinal side bars produced by the rear bearing-springs is avoided.

The improvement consists in inwardly bending the longitudinal side bars so as to produce recesses, in which the bearing-springs can be located.

I will now proceed to describe my invention with reference to the accompanying drawing, which represents for example the frame of an autotruck embodying my invention in a plan view.

1, 1 denote the two longitudinal side bars of the frame, which according to my invention are inwardly bent for the length of the two bearing-springs 2, 2, so that recesses 7, 7 are formed, in which the two springs can be disposed, so that their vertical outsides are in the same planes as the vertical outsides of the side bars 1, 1. Evidently in this manner the "gage" of the vehicle, that is the distance of the two rear wheels 6, 6 is reduced by the double width of the springs 2, 2. Only the parts which are usually located between the bearing-springs 2, 2 and the rear wheels 6, 6 must occupy their position. In the present case these parts are the brake levers 3, 3 shown in section, the pushing rod systems 4, 4 of a known autotruck, and the driving chains 5, 5. For other constructions of the motor-car of course other parts may be located between the two bearing-springs 2, 2 and the two rear wheels 6, 6. It is also evident, that the two longitudinal side bars 1, 1 are, in consequence of the improvement described, not subjected to any torsion by the two bearing-springs 2, 2, since the latter are placed in the lines of gravity of the former.

The construction of the frame of the motor-car is immaterial to my invention, which can be applied to the frame of any known automobile, autotruck, and the like.

I claim:

In a motor-car, the combination with a frame comprising two longitudinal side bars and several cross bars, of a rear axle, two rear springs rigidly connected intermediate their length with said rear axle and connected at their free ends with the two side bars of said frame, and two rear wheels turnable on the ends of said rear axle, the two side bars of said frame being inwardly bent for the length of said two rear springs so as to form two recesses for same and to bring the springs into line with the remaining portions of the side bars.

HEINRICH MAYER.

Witnesses:
 EUGENE NABEL,
 H. JORTEL.

Copies of this patent may be obtained for five cents each, by addressing the "Commissioner of Patents, Washington, D. C."